United States Patent [19]
Peters

[11] 3,874,056
[45] Apr. 1, 1975

[54] STATOR COIL PRESS
[76] Inventor: Robert W. Peters, 9036 N. 75th St., Milwaukee, Wis. 53233
[22] Filed: Sept. 27, 1973
[21] Appl. No.: 401,240

[52] U.S. Cl. ............................................. 29/205 D
[51] Int. Cl. .................... H02k 15/06, H02k 15/085
[58] Field of Search .......... 29/205 D, 205 R, 203 R, 29/203 D

[56] References Cited
UNITED STATES PATENTS
| | | | |
|---|---|---|---|
| 3,559,268 | 2/1971 | Droll | 29/205 D |
| 3,587,161 | 6/1971 | Eminger | 29/205 D |

*Primary Examiner*—Thomas H. Eager
*Attorney, Agent, or Firm*—Ronald E. Barry

[57] ABSTRACT

A stator coil press having a pair of dies mounted in a coaxial relation, one of said dies being movable toward the other die to support the stator and to form the coils on each side of the stator core, each coil forming die including a base, a support plate mounted for axial movement on said base, a plurality of external fingers pivotally mounted on said plate for movement to a position to engage the external surfaces of the coils and a plurality of internal fingers pivotally mounted on said plate for movement to a position to engage the internal surfaces of said coils, each alternate internal finger having a flat surface at the outer end which is positioned to overlap the adjacent fingers when the fingers are collapsed to the inoperative position and to form a substantially complete circle around the internal surface of the coils when pivoted to an operative position, a pair of cams mounted on said base in a position to pivot the external fingers into engagement with the outer surface of the coils and the internal fingers into engagement with the internal surface of said coils, a coil compression ring secured to said base in a position to press the coils in the space between the internal fingers and external fingers, and an adjustment ring to adjust the amount of travel between the support plate and base.

11 Claims, 7 Drawing Figures

STATOR COIL PRESS

BACKGROUND OF THE INVENTION

The coils on the stator, after winding, extend loosely outwardly from each side of the stator. No provision is made during the winding operation to position or confine the coils to a specific location or shape on the stator. The coils must, therefore, be shaped or formed after winding so that they do not obstruct the bore of the stator or extend outward beyond a limited dimension.

SUMMARY OF THE INVENTION

The stator coil press of the present invention provides for the automatic forming of the coils on the sator by applying pressure to the coils while the coils are confined within a space defined by a number of fingers or segments. A unique internal finger arrangement has been devised for applying a complete circle of pressure to the inside surface of the coil while providing sufficient clearance for mounting and removing the stator on the dies. In this regard, each alternate internal finger has a flat plate at the outer end which when aligned with the adjacent internal fingers form a substantially complete circle adjacent to the stator on the inside of the coil. When collapsed to the inoperative position, each alternate finger is nested in an overlapping relationship with the plates on the adjacent fingers to provide sufficient clearance for loading and unloading the stators into the press. The stroke of the compression plate can also be adjusted so that the coils on each side of the stator are compressed into a preset space.

DRAWINGS

DESCRIPTION OF THE INVENTION

Figure 1:
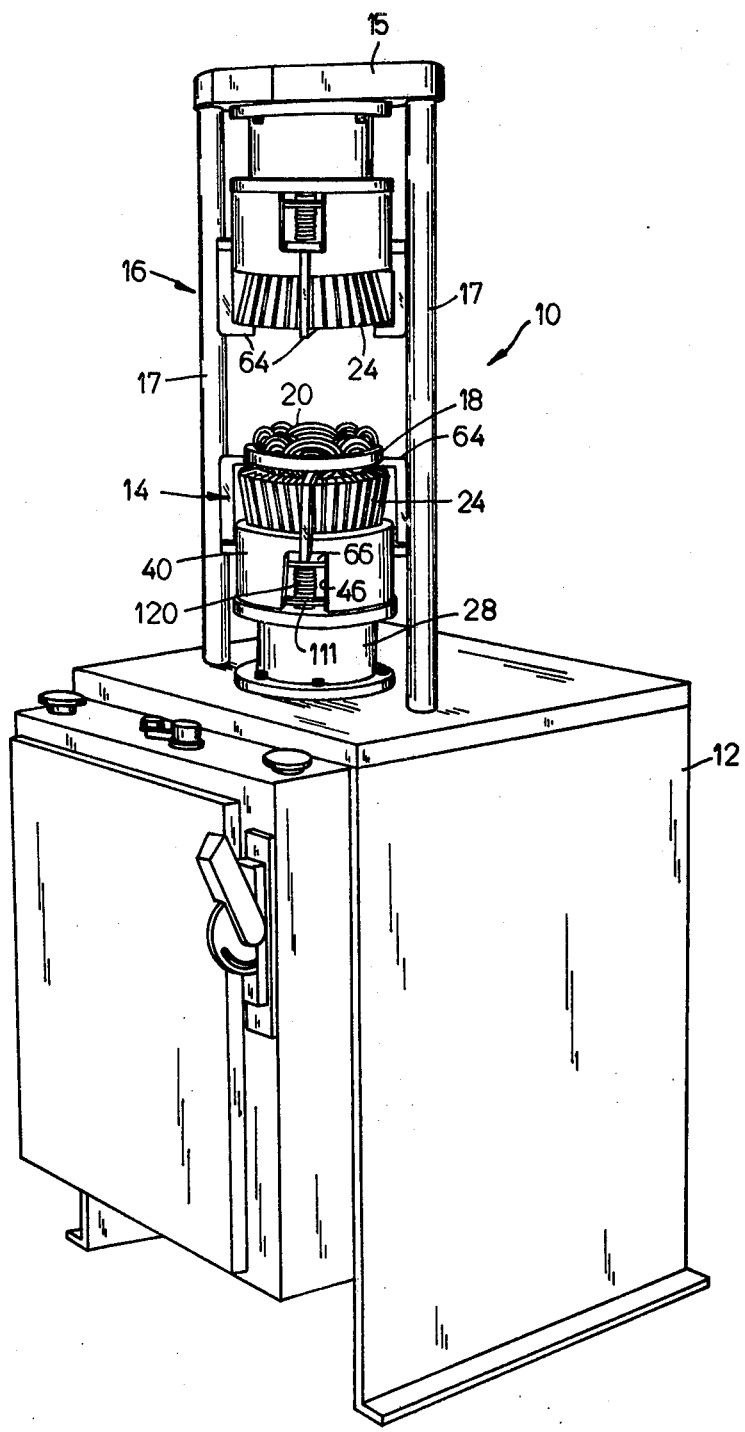
FIG. 1 is a perspective view of the stator core coil press of the present invention shown with the dies in the open or inoperative position.

Referring to the drawings and particularly FIG. 1, the coil press or former 10 generally includes a frame or base 12 having a lower or first die 14 shown mounted on the base and an upper or second die 16 supported for reciprocal movement on a cross head 15 secured to a pair of piston rods 17. The piston rods 17 are secured to piston and cylinder assemblies located in the base 12. The dies 14 and 16 are identical and are axially aligned on the frame 12. A stator 18 which has been previously wound with coils 20 is shown positioned on the lower die 14. The stator 18 is locked in the press 10 by moving the upper die 16 toward the lower die 14. The coils 20 are pressed or formed to the required shape by moving a number of inner segments or fingers 22 and outer segments or fingers 24 provided on the dies 14 and 16 into engagement with the inner and outer surfaces of the coils 20. A compression ring 26 provided on each of the dies 14 and 16 is used to press the coils 20 into a compact bundle between the inner fingers 22 and the outer fingers 24.

The Dies 14 and 16

Each of the dies 14 and 16 is identical and although referred to as upper and lower dies in the application, identical numbers will be used for the identical parts.

Figure 2:
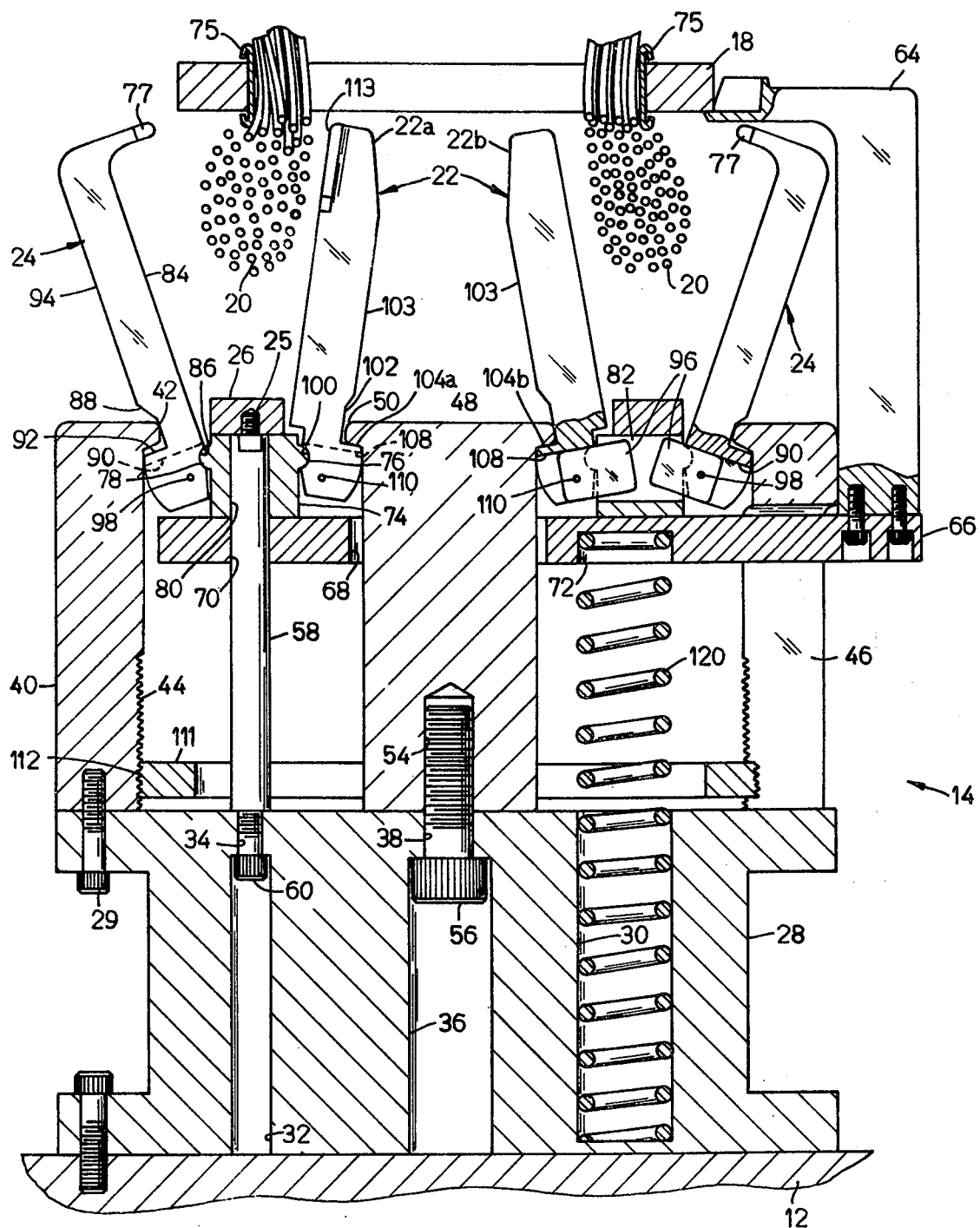
FIG. 2 is a cross section in elevation of one of the dies showing the coil forming fingers in the open or inoperative position.

Referring to FIG. 2, the lower die 14 is shown which includes a base 28 having a number of blind bores 30, a number of open bores 32 having reduced diameter ports 34 at one end and an open central bore 36 which terminates in a reduced diameter bore 38. The base 28 is secured directly to the frame 12. The base 28 for the upper die 16 is secured to the cross head 15.

Means are provided on the base 28 for actuating the outer fingers or segments 24. Such means is in the form of an annular cam ring 40 which is secured to the base 28 by bolts 29 and includes a radially inwardly extending camming flange 42 at the upper inner edge of the ring 40. A threaded section 44 is provided at the lower inner surface of the cam 40 and a number of slots 46 are provided in the cam 40.

Means are also provided on the center of the base 28 for actuating the inner coil forming segments or fingers 22. Such means is in the form of an annular cylindrical member 48 having a radially outwardly extending camming flange 50 at its upper outer surface. A threaded bore 54 is provided in the bottom of the member 48. The member 48 is secured to the base 28 by means of a bolt 56 which is positioned in the central bore 36 in the base 28 and extends through the reduced diameter bore 38 for threaded engagement with the threaded bore 54.

The coils 20 are compressed or compacted between the inner and outer segments 22 and 24 by means of the compression ring 26 which is supported on the base 28 by means of a number of push rods 58. The push rods 58 are secured to the compression ring 26 by screws 25 and to the base 28 by means of bolts 60. The bolts 60 are positioned in open bores 32 in the base 12 and extend through the reduced diameter port 34 for threaded engagement in threaded bore 62 provided in the ends of the push rods 58.

The stator 18 is supported on the base 28 by means of stator rests or supports 64 which are secured to a mounting plate 66. The mounting plate 66 includes a central aperture 68 and a number of apertures 70 for push rods 58. A number of recesses 72 corresponding to the number of blind bores 30 provided in the base 28 are provided in the bottom surface of the plate 66. The support plate 66 is biased to an inoperative position by means of springs 120 provided in bores 30 and seated in the recesses 72 in plate 66.

The plate 66 is assembled on base 28 by placing the plate on the springs 120 and inserting push rods 58 through the openings 70. The inner cam member 48, as seen in FIG. 2, is then inserted through the opening 68 in the plate 66 and secured to the base by turning bolt 56 into threaded opening 54.

The inner and outer segments or fingers 22 and 24 are supported on the mounting plate 66 by means of a pivot ring 74 provided on plate 66. In this regard, the pivot ring 74 includes an inner arcuate pivot bead or flange 76 and an outer arcuate pivot bead or flange 78. A number of openings 80 are provided in the ring 74 corresponding to the number of push rods 58 provided on the base 28. A plurality of slots 82 are provided in the ring 74 corresponding to the number of pairs of fingers 22 and 24 which are to be provided in the die.

The inner and outer segments or fingers 22 and 24 are mounted for pivotal movement about the inner arcuate bead 76 and the outer arcuate bead 78, respectively. In this regard, each of the outer coil forming segments 24 includes a body portion 84 having an arcuate notch 86 at the lower end which corresponds to the curvature of the arcuate bead 78 and a notch 88 having a flat cam surface 92 on the opposite side of the portion 84. A slot 90 is provided at the lower end of the segment 24. The segment 24 is cammed to the open or inoperative position by means of the flange 42 which engages the flat surface 92 of the recess 88 on outward movement of the plate 66. The outer segment is pivoted to the operative position by the engagement of flange 42 with the outer edge 94 of the portion 84 on inward movement of the plate 66.

The outer segment 24 is retained in a fixed position on the ring 74 by means of a plate 96 which is positioned within the slot 90 in the outer segment and retained therein by means of a pin 98. The plate 96 extends into the slot 82 in the pivot ring 74 to maintain the outer segment in a fixed position with respect to the ring 74. The number of outer segments 24 should equal the number of slots in the stator.

Means are provided at the ends of the outer segments to support the stator cells 75 during the forming operation. Such means is in the form of a guide or point 77 provided at the end of the segment 24. The guide or point 77 will be positioned between the cells 75 to form a backing for the cell when the coil is formed.

The inner segments 22a and 22b are pivotally mounted on the inner arcuate bead 76. In this regard, each of the inner segments 22 includes a body portion 99 having an arcuate notch 100 at the lower end and a notch 102 having a flat cam surface 104 on the opposite edge of the segment 22. The inner segments 22 are pivoted inwardly to the inoperative position by means of the flange 50 which engages the flat cam surface 104 in the notch 102. The inner segments are pivoted outwardly to the operative position by means of the engagement of the flange 50 with the inner edge 103 of the portion 99. The inner segments are retained in a fixed position with respect to the ring 74 also by means of a plate 96 which is secured within a slot 108 in the inner segment by means of a pin 110.

Figure 5:
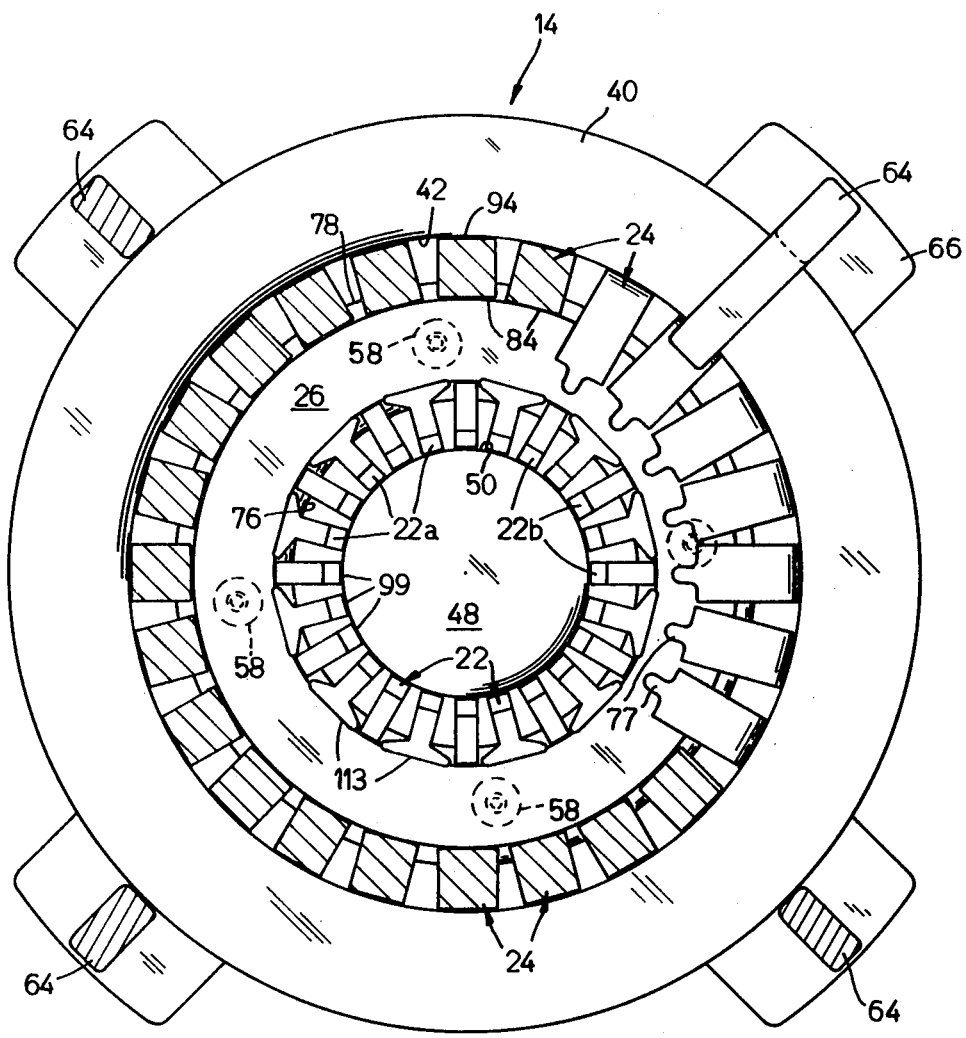
FIG. 5 is a top view of the die shown in FIG. 4.

Means are provided on the inner segments 22a for engaging and pressing the coils outwardly at the point where the coils emerge from the stator slots. It should be noted that the coils extend axially when they emerge from the slots and that a full contact circle is necessary in order to assure that all of the coil wires are pushed outwardly. Such means is in the form of a flat plate or paddle 113 provided at the upper inner end of segments 22a. When the segments 22a and 22b are moved to the operative position as shown in FIG. 5, the plates 113 and the upper ends of segments 22b will form a continuous round surface around the inside surface of the coil and immediately adjacent to the stator core.

In order to collapse the segments 22a and 22b sufficiently to provide clearance for placing the stator core on the die and removing the stator core from the die, the segments must be collapsed in a staggered or nested relation.

Figure 3:
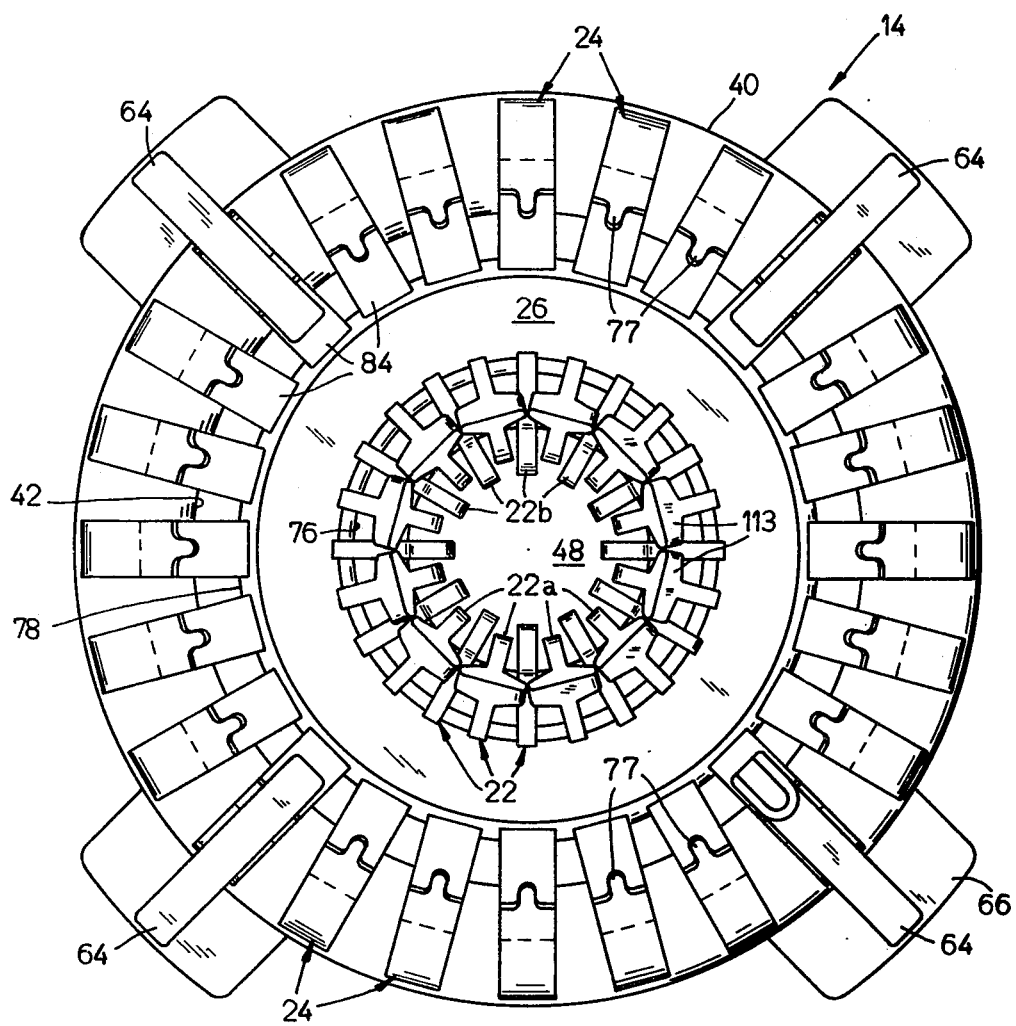
FIG. 3 is a top view of the die shown in FIG. 2.
Figure 6:
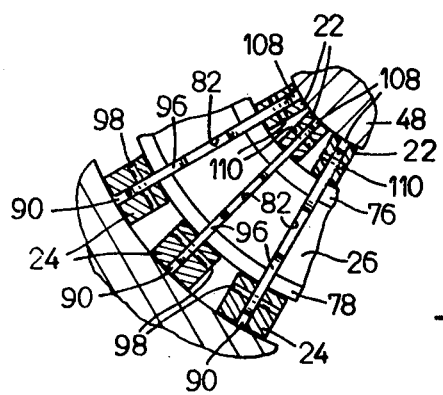
FIG. 6 is a section view showing the mounting of the segments on the pivot ring.

Referring to FIG. 3, the arrangement of the inner segments is shown when in the inoperative position. It will be noted that each alternate segment 22a is staggered from the adjacent segment 22b in order to provide clearance for the stator coil 20. Means are provided for staggering the segments 22a and 22b one from the other on movement to the inoperative position. Such means is in the form of a variation in the distance of the flat surface 104a from the pivot axis of the inner segment 22a and the distance of the flat surface 104b from the pivot axis of the inner segment 22b. In this regard and referring to FIG. 6, a side-by-side comparison is shown between the inner segments 22a and 22b. A line a is drawn through the pivot axis of both segments. The distance x of surface 104b from line a is greater than the distance y of surface 104a from line a.

On movement of the plate 66 to the inoperative position, FIG. 2, the surface 104b on segment 22b will engage the cam 50 before the surface 104a on segment 22a. The segments 22b will pivot a distance slightly more than segments 22a to obtain the staggered or nested relation shown in FIG. 2.

The stroke of the compression ring 26 can be adjusted by means of an adjusting ring 110. The adjusting ring 110 includes a threaded surface 112 on its outer surface which is threaded into the threaded section 44 of the cam ring 40. The plate 66 will bottom on the adjusting ring 44 so that the compression space for the coil is the same on both sides of the stator 18.

Operation

In operation, a stator 18 is placed on the supports 64 on the die 14. The hydraulic piston and cylinder assembly in the frame 12 is actuated to pull the cross head 15 toward the die 14. If properly aligned, the supports 64 on die 16 will engage and lock the stator between the two dies 14 and 16.

Figure 4:
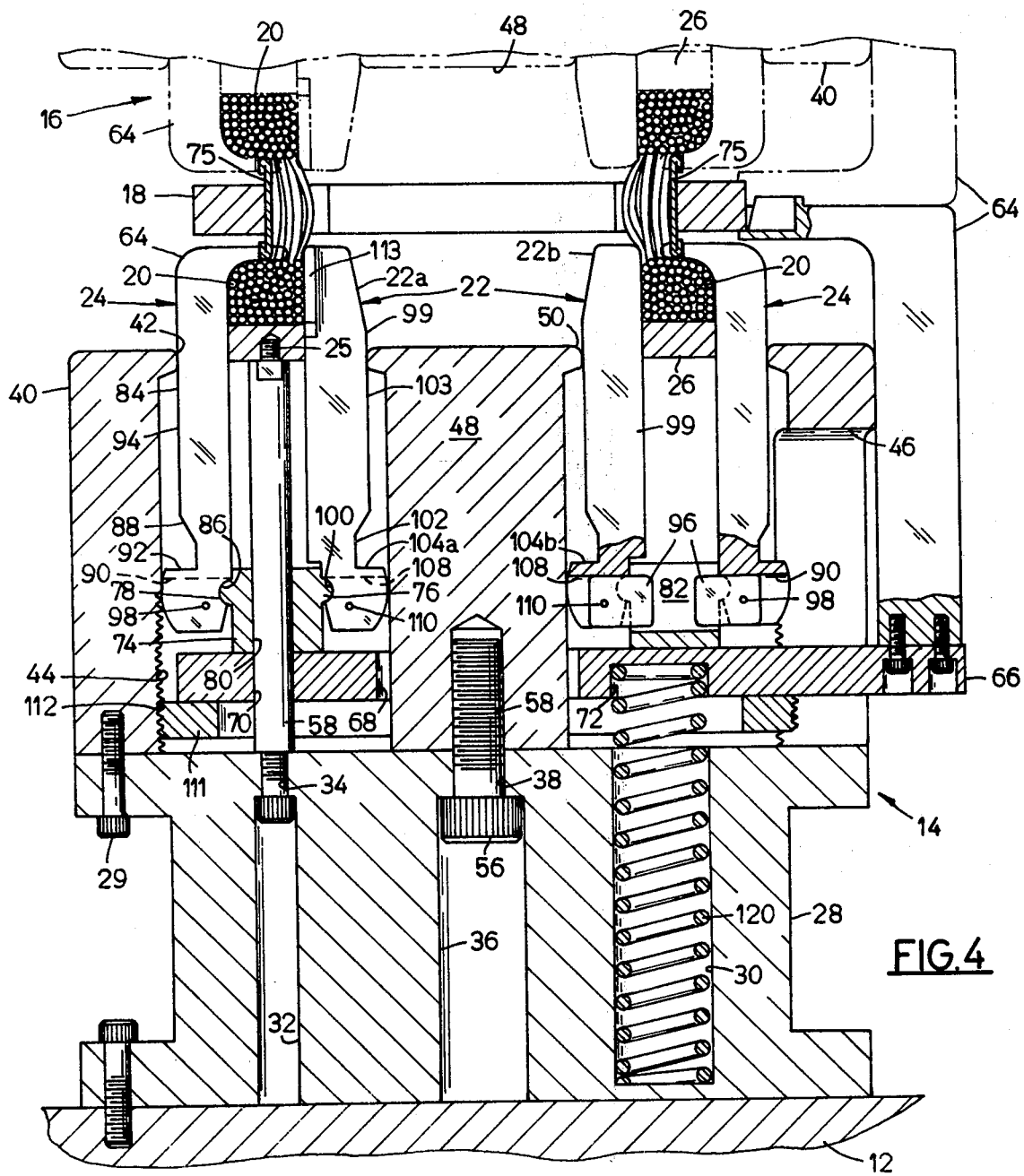
FIG. 4 is a cross sectional view in section showing the coil forming fingers in the closed or operative position and the stator coils squeezed between the fingers.
Figure 7:
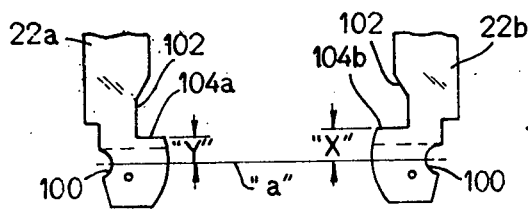
FIG. 7 is a comparative view of the cam surfaces of the inner segments.

As the dies 14 and 16 move towards each other, the stator 18 will force the stator rest 64 and mounting plate 66 towards the base 28 in both dies. The movement of the mounting plate 66 towards the base 28 will cause the cams 42 and 50 to engage the edges 94 and 103 of the segments 24 and 22, respectively, moving the segments into engagement with the outer and inner surfaces of the coils 20 on the stator 18 (FIGS. 4 and 5). The inner segments 22a and 22b will form a substantially complete ring around the inner surface of the coils adjacent to the edge of the stator 18. Continued movement of the dies toward each other will move the plate 66 and segments 22 and 24 far enough into the space between the inner and outer cams 40 and 48 for the compression plate 26 to compact the coil tightly in the space between the inner and outer segments. The dies 16 will continue to move until the plates 66 in both dies bottom on the adjusting ring 112.

The motion of the die 16 is reversed to release the stators from the press. The plate 66 will follow the die due to the bias of the springs 120 until the flanges 42 and 50 engage the flat surfaces 92 and 104 on the outer and inner segments pivoting the segments to their inoperative position.

I claim:

1. A stator coil former comprising: a frame, a pair of dies mounted on said frame in an opposing relation, means for moving said dies toward each other to an operative position and away from each other to an inoperative position, each die including a base, means mounted on each of said bases for supporting a stator between said dies, said supporting means being movable relative to said base on movement of said dies between operative and inoperative positions, means for biasing said supporting means to inoperative positions, a number of outer coil forming segments mounted on said supporting means for movement between operative and inoperative positions, a number of inner coil forming segments mounted on said supporting means for movement between operative and inoperative positions, said inner coil forming segments including means for staggering said inner segments when moved to the inoperative position, cam means mounted on said base for moving said segments to an operative position on movement of said supporting means relative to said base and to an inoperative position on movement of said supporting means to the inoperative position, and means secured to said base for compressing the stator coils confined in the space between said inner and outer segments on movement of said dies toward the operative position.

2. The former according to claim 1 wherein each alternate inner segment includes a plate shaped to form a substantially round compressing surface by the outer ends of the inner segments when moved to the operative position.

3. The former according to claim 1 wherein each of said inner segments includes a flat cam surface for pivoting the inner segments to the inoperative position, the cam surface on each alternate inner segment being located a distance from its pivot axis greater than the adjacent segment.

4. The former according to claim 1 wherein said cam means includes a cam ring mounted on said base in a position to engage said outer segments and a cylindrical cam member positioned to engage said inner segments.

5. The former according to claim 1 including means operatively connected to said cam means for adjusting the amount of relative movement of said supporting means with respect to said base to control the stroke of the compressing means.

6. The former according to claim 5 wherein said cam means includes a cam ring having a threaded section on its inner surface and said adjusting means comprises an adjusting ring having a threaded section on its outer surface, the adjusting ring being threadedly received in the threaded section of said cam ring.

7. A stator coil former for compacting the coils in the cells of a wound stator comprising, a frame, a pair of dies mounted on said frame in an opposing relation, means for moving one of said dies toward the other die to form the coils on the stator, each die including a base, an inner cam member mounted on said base and having a radially outwardly extending cam surface, an outer cam member mounted on said base and having an inwardly radially extending cam surface, a number of push rods mounted on said base between said cam members, a coil compression plate supported on the ends of said rods between said cam members, a mounting plate mounted for reciprocal movement on said push rods, a number of stator supports mounted on said mounting plates for supporting the stator between said dies, a pivot ring mounted on said mounting plate, a number of inner coil forming segments having camming surfaces positioned to engage the cam surface of said inner cam member and being pivotally mounted on said pivot ring, the camming surfaces on alternate inner coil segments are located to provide pivotal movement toward an inoperative position subsequent to the movement of the adjacent inner coil forming segments toward the inoperative position, a number of outer coil forming segments having camming surfaces positioned to engage the cam surface on said outer cam ring mounted on said pivot ring and means for biasing said mounting plate inwardly toward said compression plate whereby said outer segments are cammed outwardly to an open position and said inner segments are cammed inwardly to a nested position.

8. The former according to claim 7 including means for adjusting the amount of travel of said mounting plate relative to said inner and outer cam members.

9. The former according to claim 8 wherein said outer cam member includes an internal threaded section and said adjusting means includes an adjusting ring having an outer threaded surface for threadedly engaging said inner threaded section.

10. The former according to claim 7 wherein each pair of corresponding inner and outer segments includes means for retaining said segments in a common plane.

11. The former according to claim 1 wherein each outer segment includes means for supporting the stator cells during forming.

* * * * *